US010921446B2

(12) United States Patent
Sipko et al.

(10) Patent No.: US 10,921,446 B2
(45) Date of Patent: Feb. 16, 2021

(54) COLLABORATIVE MAPPING OF A SPACE USING ULTRASONIC SONAR

(71) Applicant: MICROSOFT TECHNOLOGY LICENSING, LLC, Redmond, WA (US)

(72) Inventors: Jeffrey Ryan Sipko, Kirkland, WA (US); Adolfo Hernandez Santisteban, Bothell, WA (US); Aaron Daniel Krauss, Snoqualmie, WA (US); Priya Ganadas, Seattle, WA (US); Arthur C. Tomlin, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 376 days.

(21) Appl. No.: 15/947,614

(22) Filed: Apr. 6, 2018

(65) Prior Publication Data

US 2019/0310366 A1 Oct. 10, 2019

(51) Int. Cl.
*G01S 15/00* (2020.01)
*G01S 15/89* (2006.01)
(Continued)

(52) U.S. Cl.
CPC .............. *G01S 15/89* (2013.01); *G01S 7/003* (2013.01); *G01S 7/6245* (2013.01); *G01S 15/87* (2013.01); *G01S 15/878* (2013.01)

(58) Field of Classification Search
USPC .......................................................... 367/88
See application file for complete search history.

(56) References Cited

U.S. PATENT DOCUMENTS 6,847,391 B1  1/2005  Kassatly
9,469,030 B2  10/2016  Wang et al.
(Continued)

FOREIGN PATENT DOCUMENTS

WO  2010095077 A1  8/2010
WO  2015182956 A1  12/2015

OTHER PUBLICATIONS

Aggarwal, Param, "Mapping a Room Wh Ultrasonic Distance Sensors", Retrieved from <<https://www.hackster.io/paramaggarwal/mapping-a-room-wh-ultrasonic-distance-sensors-9725b7>>, Jan. 3, 2017, 11 Pages.

(Continued)

*Primary Examiner* — James R Hulka
(74) *Attorney, Agent, or Firm* — Shook, Hardy & Bacon L.L.P.

(57) ABSTRACT

Generally, a scanning device performs a sonic scan of a space by generating an ultrasonic impulse and measuring reflected signals as raw audio data. Sonic scan data including raw audio data and an associated scan location is forwarded to a sonic mapping service, which generates and distributes a 3D map of the space called a sonic map. When multiple devices contribute, the map is a collaborative sonic map. The sonic mapping service is advantageously available as distributed computing service, and can detect acoustic characteristics of the space and/or attribute visual/audio features to elements of a 3D model based on a corresponding detected acoustic characteristic. Various implementations that utilize a sonic map, detected acoustic characteristics, an impacted visual map, and/or an impacted 3D object include mixed reality communications, automatic calibration, relocalization, visualizing materials, rendering 3D geometry, and the like.

20 Claims, 11 Drawing Sheets

(51) Int. Cl.
  *G01S 15/87* (2006.01)
  *G01S 7/00* (2006.01)
  *G01S 7/62* (2006.01)

(56) References Cited

U.S. PATENT DOCUMENTS

| | | | |
|---|---|---|---|
| 9,532,155 B1 | 12/2016 | Massie et al. | |
| 9,612,329 B2 | 4/2017 | Chen et al. | |
| 9,693,169 B1 | 6/2017 | Carlsson et al. | |
| 9,774,824 B1 | 9/2017 | Brady et al. | |
| 9,779,550 B2 | 10/2017 | Tobita | |
| 9,910,937 B2* | 3/2018 | Patwari | G06F 3/165 |
| 2011/0211037 A1 | 9/2011 | Gygax et al. | |
| 2012/0192088 A1 | 7/2012 | Sauriol et al. | |
| 2015/0235423 A1* | 8/2015 | Tobita | G06T 19/006 |
| | | | 345/633 |
| 2015/0347638 A1* | 12/2015 | Patwari | G01S 15/89 |
| | | | 703/1 |
| 2016/0046021 A1* | 2/2016 | Wang | G05D 1/024 |
| | | | 700/252 |
| 2016/0091604 A1* | 3/2016 | Chen | G01S 15/88 |
| | | | 367/93 |

OTHER PUBLICATIONS

Dokmanic, et al., "Acoustic Echoes Reveal Room Shape", In Proceedings of National Academy of Sciences, vol. 110, Issue 30, Jul. 23, 2013, pp. 1-6.

Filos, Jason, "Inferring Room Geometries", In PhD Thesis of Imperial College London, Aug. 2012, 162 Pages.

"International Search Report and Written Opinion Issued in PCT Application No. PCT/US2019/023801", dated Jun. 13, 2019, 16 Pages.

Savioja, et al. "Creating Interactive Virtual Acoustic Environment", In Journal of Audio Engineering Society, vol. 47, Issue 9, Sep. 1, 1999, 31 Pages.

Huopaniemi, et al. "Creating Interactive Virtual Auditory Environments", In Proceedings of IEEE Computer Graphics and Applications, vol. 22, Issue 4, Jul. 1, 2002, 9 Pages.

Schroder, Dirk ,"Physically Based Real-Time Auralization of Interactive Virtual Environments", By Logos Verlag Berlin GmbH, Feb. 4, 2011, 242 Pages.

* cited by examiner

US 10,921,446 B2

COLLABORATIVE MAPPING OF A SPACE USING ULTRASONIC SONAR

BACKGROUND

Generally, the properties of sound can change depending on the environment in which the sound exists. For example, the size of a room and the material composition of objects such as walls or other objects can impact the way sound reflects, absorbs, and reverberates. By shouting in a large, open cathedral, the sound of your voice can bounce off walls, floors, and ceilings, creating an echo. On the other hand, shouting in a small room with fabric-lined walls may not produce an echo because the fabric can absorb the sound. As a general matter, the acoustic characteristics of an environment can impact the properties of sound in that environment.

SUMMARY

Embodiments described herein provide methods and systems for mapping a space using ultrasonic sonar. Generally, a computing device capable of generating ultrasonic impulses and measuring ultrasonic impulse responses (e.g., a scanner or scanning device) can be used to scan and map a particular space. A speaker/transducer of the scanner generates an ultrasonic impulse, and a microphone of the scanner captures raw audio data including the source signal (the impulse) and any echoes/reflections from the space. Depending on the microphone pattern and/or geometry, various scanning techniques can be applied in order to gather sufficient raw audio data to map a particular space. For example, an omnidirectional microphone may be utilized to perform as few as one scan of the entire space. In another example, an array of directional microphones can be used to perform four scans, one in each of four directions spanning 360° in the space (e.g., one scan for each of four walls in a room). The scanner determines a location of the scan, associates the location with the scan and/or the raw audio data, and provides sonic scan data including the raw audio data and associated location to a sonic mapping service.

A sonic mapping service generates a sonic map based on sonic scan data. The sonic map is a 3D representation of the space generated using the sonic scan data. Any number of scans can be utilized to generate the sonic map, and the more scans used, the higher the resolution of the resulting sonic map. In embodiments in which multiple scanners contribute sonic scan data, the resulting map is called a collaborative sonic map. In some embodiments, the sonic mapping service is a distributed computing service that generates and distributes a sonic map to various user devices. The sonic mapping service can be configured to utilize machine data to generate the sonic map, and is advantageously accessible to a computing device such as a scanner and/or some other non-scanning computing device, substantially in real time. The sonic mapping service or some related component may detect acoustic characteristics of the space (e.g., materials, occlusions, reverberations, reflections, absorptions, etc.) and/or attribute visual/audio features to elements of a 3D model (e.g., the sonic map, a visual map, a particular 3D particular, etc.) based on a corresponding detected acoustic characteristic (e.g., a detected material). The sonic map, detected acoustic features, an impacted visual map, and/or an impacted 3D object can be stored in a map bank and provided to the scanner and/or any other networked device.

Various implementations are possible that utilize a sonic map, detected acoustic characteristics, an impacted visual map, and/or an impacted 3D object, including mixed reality communications, automatic calibration, relocalization, visualizing materials, rendering 3D geometry, and the like. Using ultrasonic mapping, a sonic mapping service, and/or collaborative sonic maps, knowledge gleaned using sonar can be used to improve communication, calibration, and virtualization.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
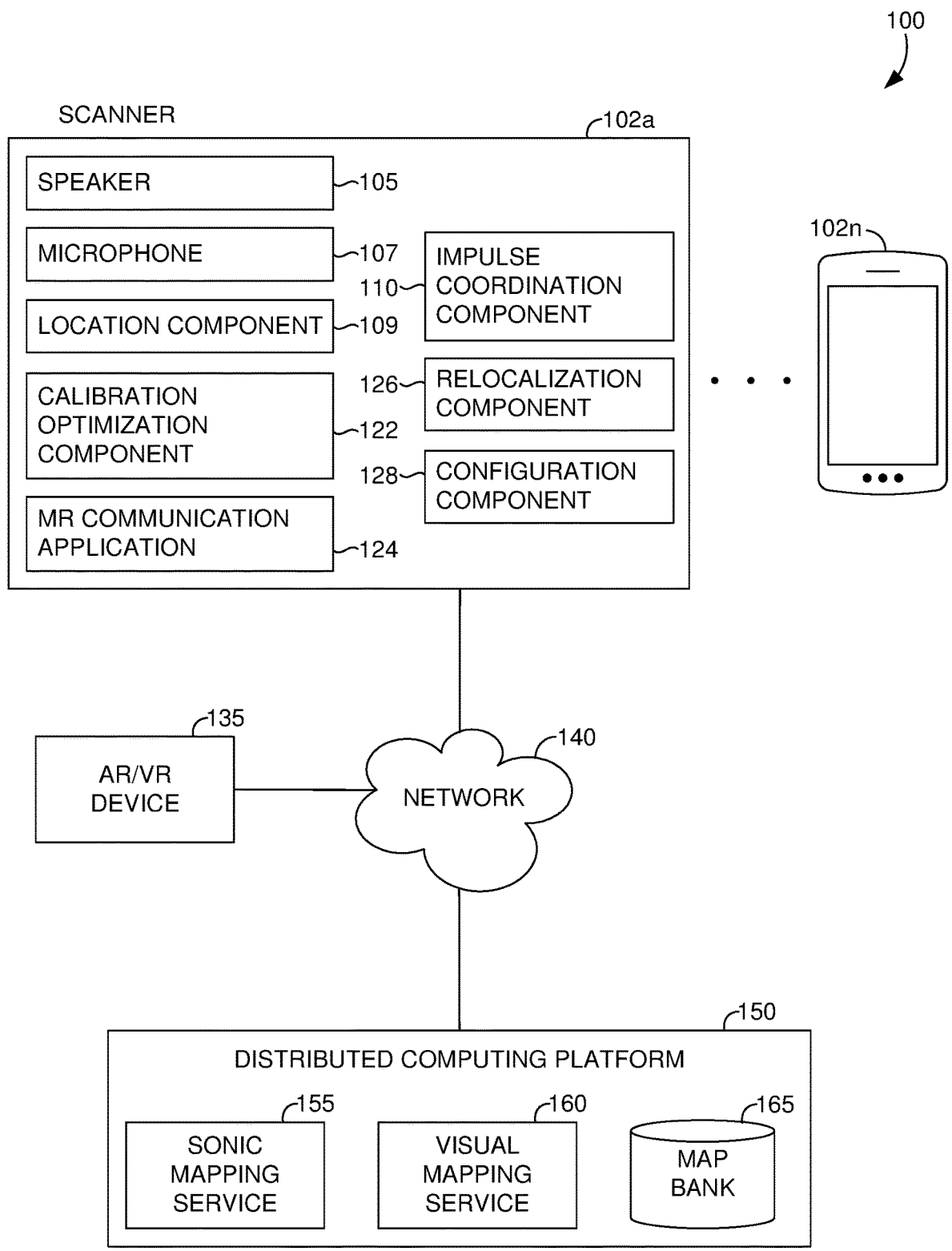
FIG. 1 is a block diagram depicting an ultrasonic mapping system, in accordance with embodiments described herein.

Some systems can simulate a virtual acoustic environment with acoustic characteristics of a corresponding physical environment. An impulse response for a physical environment can be used to modify an arbitrary sound, producing a virtual sound with properties corresponding to the physical environment. Thus, the virtual sound appears to originate in the physical environment. Generally, the impulse response encodes a virtual acoustic environment corresponding to the physical environment in which it was measured. However, existing techniques for measuring impulse responses and generating a virtual acoustic environment have various drawbacks. For example, existing measurement devices and modeling techniques require bulky hardware, so conventional techniques generally lack mobility and/or the ability to generate a virtual environment for use on the fly. Moreover, conventional techniques that involve measurements in one location and a subsequent analysis in another location can result in inefficiencies. For example, if problems with the measurements or other unexpected phenomena are uncovered during a subsequent analysis once the test setup has been broken down, the measurements may be unusable. Such a result can require a new setup and new measurements, resulting in undesirable rework.

Moreover, some systems can detect visual features of a physical environment using optical components such as cameras, visual depth sensors, infrared sensors, and the like. Detected visual features can be used to generate a three-dimensional ("3D") representation of the physical environment (e.g., a 3D model). As used herein, a visual map refers to a 3D representation of a physical environment generated from optical measurements using optical components. Detected visual features can also be used to perform visual tracking. However, visual mapping and visual tracking suffer from various drawbacks. For example, although optical components like cameras can be used to identify where something is in a space, they cannot identify how sound travels through the space (e.g., the impulse response) or the acoustic characteristics of the space. As such, a visual map is an imperfect model of a physical space.

Moreover, visual mapping and visual tracking suffer from reflectance and transmittance issues. When an optical component encounters a mirror or a window, the component will incorrectly perceive the window or mirror as an extension of the space, creating undesirable errors in visual mapping and visual tracking techniques. In addition, visual mapping and visual tracking systems generally consume significant amounts of power and require significant processing demands (e.g., CPU, memory, etc.). This has led to conventionally large and expensive visual mapping and visual tracking components. As such, visual mapping and visual tracking have generally been limited to professional markets.

Embodiments described herein provide simple and efficient methods and systems for ultrasonically mapping a space such as a room. At a high level, a scanner can be used to generate an ultrasonic impulse in the room. One or more microphones (e.g., a microphone array or "mic array") on the scanner each pick up an impulse response, one stream for each microphone. Generally, the impulse response is a measured audio stream, which may include the source signal (impulse) and any echoes/reflections from the space. Generally, a scan involves recording the impulse response over a suitable time duration as raw audio data. Any suitable microphone pattern (e.g., omnidirectional, directional) and/or microphone geometry (e.g., single microphone, substantially planer array, spherical array, etc.) is possible.

Depending on the microphone pattern and/or geometry, various scanning techniques can be applied in order to gather sufficient raw audio data to map a particular space. Generally, one or more omnidirectional or directional microphones (e.g., in a mic array) may be utilized to perform any number of scans of the space to measure corresponding impulse responses. For example, an omnidirectional microphone may be utilized to perform as few as one scan of the entire space. In another example, an array of directional microphones can be used to perform four scans, one in each of four directions spanning 360° in the space (e.g., one scan for each of four walls in a room). The sonic map can be derived from the impulse(s) and the corresponding impulse response(s), whether by the scanner or some other component.

A sonic map can be generated from one or more scans (e.g., one or more impulses and corresponding impulse response(s)) and their associated measurement location(s). Generally, raw audio data representing the impulse response(s) and corresponding measurement location(s) are provided to a sonic mapping service and used to generate a 3D representation of the space. This 3D representation is called a sonic map because it is generated using acoustic impulse responses. Advantageously, the sonic mapping service is a distributed computing service accessible to the scanner and/or other non-scanning computing device substantially in real time. By making the sonic mapping service separate from the scanner, various lightweight implementations are possible for the scanner. Similarly, by making the sonic mapping service available substantially in real time, a user can troubleshoot any issues that may arise and make instant use of the sonic map. In some embodiments, the sonic mapping service utilizes machine learning to generate the sonic map and/or to detect acoustic characteristics of the space.

The sonic mapping service (or some related component) may detect acoustic characteristics of the space (e.g., materials, occlusions, reverberations, reflections, absorptions, etc.) and/or attribute visual/audio features to elements of a 3D model (e.g., the sonic map, a visual map, etc.) based on a corresponding detected acoustic characteristic (e.g., a detected material). Any or all of the sonic map, detected acoustic features, an impacted visual map, or an impacted 3D object can be stored in a map bank and provided to the scanner and/or any other networked device.

In one example implementation, multiple devices could be networked together and used in combination to generate and/or make use of a collaborative sonic map. In some embodiments, multiple devices may be configured to contribute to and/or consume from the collaborative sonic map. For example, handheld devices such as smart phones can be used to perform sonic scanning, and the sonic mapping service can be made available to the handheld devices as a distributed computing service. Regarding contribution to the collaborative sonic map, multiple devices can be configured to measure impulse responses (e.g., raw audio data) for a space, and provide this information along with measurement locations to the sonic mapping service to stitch together to generate and/or update a collaborative sonic map. Because some microphones are limited to a pickup radius of around three to four meters, taking multiple scans in the space can improve the resolution of the resulting sonic map. The collaborative sonic map can be synchronized across any number of devices so that any number of devices can download and make use of the sonic map.

Various implementations are possible that utilize a sonic map, detected acoustic characteristics, an impacted visual map, and/or an impacted 3D object, including mixed reality communications, automatic calibration, relocalization, visualizing materials, rendering 3D geometry, and the like. For example, a sonic map and/or a corresponding impulse response can be used to derive an audio transform, which can be applied to change the impulse response of one space to simulate the acoustic characteristics of a mapped space. By way of nonlimiting example, where the mapped space is a conference room, the audio transform can be applied to an audio (e.g., a conference call) to simulate the acoustic characteristics of the conference room. This type of mixed reality communication can make a remote user feel as if he or she is actually present in the conference room. Sonic maps can be saved, associated with the corresponding physical space, and automatically used to transform an audio feed (e.g., an audio feed of a meeting occurring in the conference room) for remote users. In some embodiments, an audio feed (e.g., the meeting feed) can be automatically recalibrated based on a number of people in the room and/or any detected changes to the space (e.g., an opened window). More generally, speakers, microphones, and/or cameras can be calibrated based on a sonic map (e.g., by automatically directing a microphone or camera at a detected subject).

In another example implementation, relocalization can be applied to locate a particular device within a known space (e.g., where in the room the device is located) and/or to locate a particular space (e.g., which room in the building the device is located). In yet another example implementation, visualizations of detected acoustic characteristics can be applied to a corresponding 3D model (e.g., a corresponding surface of a 3D model of the space, a 3D model of a detected object, etc.). Additionally and/or alternatively, behaviors of 3D objects can be determined based on corresponding detected acoustic characteristics, for example, so that interactions with the 3D object look, sound, or feel the way a user might expect (e.g., so a wooden surface behaves like a wooden surface). Various other implementations will be understood by those of ordinary skill in the art.

As such, mixed reality communications, automatic calibration, relocalization, visualizing materials, rendering 3D geometry, and the like, can be achieved using ultrasonic mapping, a sonic mapping service, and/or collaborative sonic maps. These techniques enable various improvements over conventional techniques. For example, the use of ultrasound provides increased privacy over visual techniques such as techniques using cameras or infrared sensors. Moreover, because the emitted sound is above the frequency limit for human hearing, mapping can occur during a meeting substantially in real time without intrusion or interference with human communications.

Further, sonar consumes less power than visual mapping techniques. As such, rather than using a high fidelity sensor like a visual depth sensor, using a sonar-based approach and continuously building up a sonic map of the environment, a lower power-cost map of an environment can be generated. This latter benefit can be enhanced by implementing the sonic mapping service separately from the scanner, enabling various lightweight scanning implementations and increased access for consumers and consumer applications. Similarly, making the sonic mapping service available substantially in real time improves upon conventional techniques because a user can now troubleshoot measurement issues that may arise and make instant use of the sonic map.

Additionally, unlike visual mapping and visual tracking, sonic mapping does not suffer from reflectance and transmittance issues impacting the accuracy of measurements. For example, because light will reflect from a mirror or pass through a window, visual mapping and visual tracking techniques generally cannot actually detect such surfaces. Meanwhile with sonar, the same surfaces will reflect sound, so sonic mapping can accurately detect such surfaces.

Using sonar mapping can also improve other aspects of virtualization. Although the use of sonar may in some scenarios provide improvements vis-à-vis visual techniques, in some embodiments, sonar can be used to supplement visual techniques. For example, in circumstances where high fidelity visual detection is desirable such as augmented and virtual reality (AR/VR), visual techniques can be combined with sonar-based techniques to provide increased functionality. For example, a visual map can be supplemented with knowledge gleaned using sonar. As material types are recognized based on their acoustic reflectance, a corresponding visual appearance can be applied to a corresponding object (e.g., so a metal pillar looks like metal). Similarly, corresponding physical properties can be modeled (e.g., acoustic properties, reaction properties, haptics, etc.). In this manner, knowledge gleaned using sonar can be used to enhance the virtualization of corresponding objects.

Exemplary Ultrasonic Mapping Environment

Referring now to FIG. 1, a block diagram of exemplary environment 100 suitable for use in implementing embodiments of the invention is shown. Generally, environment 100 is suitable for ultrasonic mapping, distributed computing, and collaborative sonic maps, and, among other things, facilitates mixed reality communications, automatic calibration, relocalization, visualizing materials, rendering 3D geometry, and the like. Generally, environment 100 includes one or more scanners 102a . . . 102n capable of generating ultrasonic impulses and measuring corresponding impulse responses as raw audio data. Environment 100 also includes distributed computing platform 150 is capable of generating a sonic map from the raw audio data by stitching together the corresponding impulse responses. Environment 100 also includes any number of devices capable of using the sonic map such as scanners 102a . . . 102n and/or AR/VR device 135.

Scanners 102a . . . 102n, can be any kind of computing device capable of generating ultrasonic impulses and measuring ultrasonic impulse responses. For example, in an embodiment, scanner 102a can be a computing device such as computing device 1200, as described below with reference to FIG. 12. In some embodiments, scanner 102a can be a mobile computing device such as a mobile display, a cell phone, a tablet, a PDA, a laptop computer, an augmented reality device, a virtual reality device, or generally any other suitable mobile computing device. In some embodiments, scanner 102a can be a fixed computing device such as a fixed-position Internet of Things (IoT) device which includes sonic mapping capabilities, a sensor package that can be attached to a fixed computing device such as a desktop computer, and the like. Further, environment 100 can include any number of devices capable of using the sonic map, whether or not they are capable of contributing, or actually contribute, to the sonic map, such as one or more of scanners 102a . . . 102n and/or any other suitable computing device.

AR/VR device 135 is depicted merely as a nonlimiting example of one possible device that can utilize a sonic map without contributing to it. Generally, AR/VR device 135 can be any kind of computing device capable of facilitating virtual and/or augmented reality such as computing device 1200 of FIG. 12, a head-mounted display (e.g., a VR headset, an AR headset such as head-mounted display 1002 of FIG. 10 and the head-mounted display described below with respect to FIG. 11, etc.), a personal computer (PC), a laptop computer, a workstation, a mobile computing device, a PDA, a cell phone, a combination thereof, or the like. Environment 100 also includes distributed computing platform 150, which can correspond to cloud computing platform 910 in FIG. 9.

The components of environment 100 may communicate with each other via a network 140, which may include, without limitation, one or more local area networks (LANs) and/or wide area networks (WANs). Such networking environments are commonplace in offices, enterprise-wide computer networks, intranets, and the Internet.

In the embodiment illustrated in FIG. 1, scanner 102*a* includes speaker 105, microphone 107, location component 109, impulse coordination component 110, calibration optimization component 122, mixed reality (MR) communication component 124, relocalization component 126, and configuration component 128. Generally, scanner 102*a* is capable of generating ultrasonic impulses and measuring impulse responses (e.g., raw audio data). Any suitable arrangement of one or more speakers can be used to generate an impulse and one or more microphones can be utilized to record a response. For example, scanner 102*a* can include one or more speakers/transducers (e.g., speaker 105), drive circuitry, and associated control electronics. Advantageously, scanner 102*a* can generate an ultrasonic impulse as a source signal. However, in some embodiments, any other frequency may be utilized. Generally, the generated sound waves will reflect (echo) off surfaces and bounce back toward scanner 102*a*. Accordingly, scanner 102*a* can include one or more microphones (e.g., microphone 107), each microphone configured to receive an audio stream (which may include the source signal and reflected signals), audio capture circuitry, and associated electronics. Generally, the speaker(s) and microphone(s) are arranged with fixed positions relative to one another. For example, the speaker(s) and microphone(s) can be integrated at fixed positions on the scanner.

In some scenarios, design constraints may place limitations on which sensors can be used in a particular hardware package or device. For example, a design team may be tasked with exploring whether a predetermined hardware package can support an improved audio and/or visual experience. Such scenarios may occur based on design constraints implemented during product development, in the context of potential software updates to existing devices such as smart phones, or otherwise. As such, in some embodiments, the speaker(s) and microphone(s) may be standard components used in consumer electronics such as smart phones, and impulse coordination can be implemented using a software application, patch, plugin, or the like. In some embodiments, the speaker(s) and/or microphone(s) can be integrated into a hardware expansion added to a computing device to assemble scanner 102*a*.

Figure 2A:
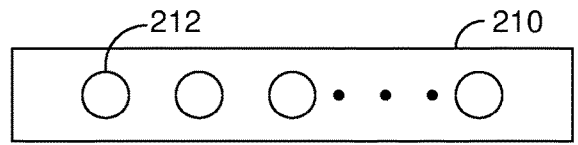
FIGS. 2A-2D illustrate microphone arrays for an ultrasonic mapping system, in accordance with embodiments described herein.
Figure 2B:
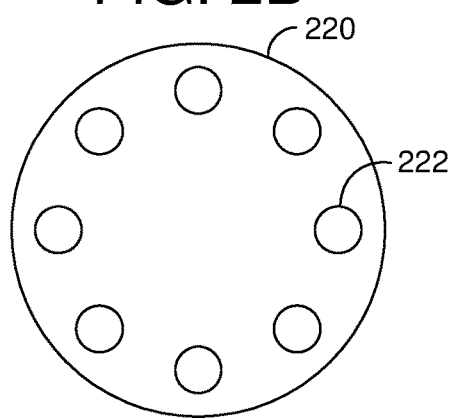
Figure 2C:
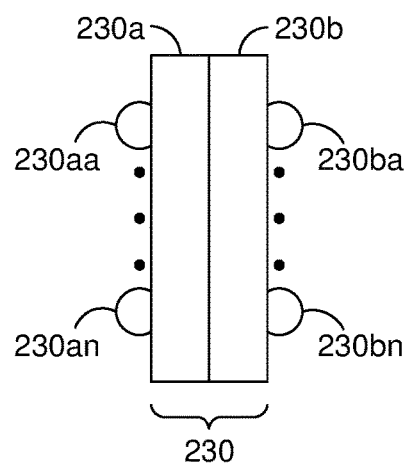
Figure 2D:
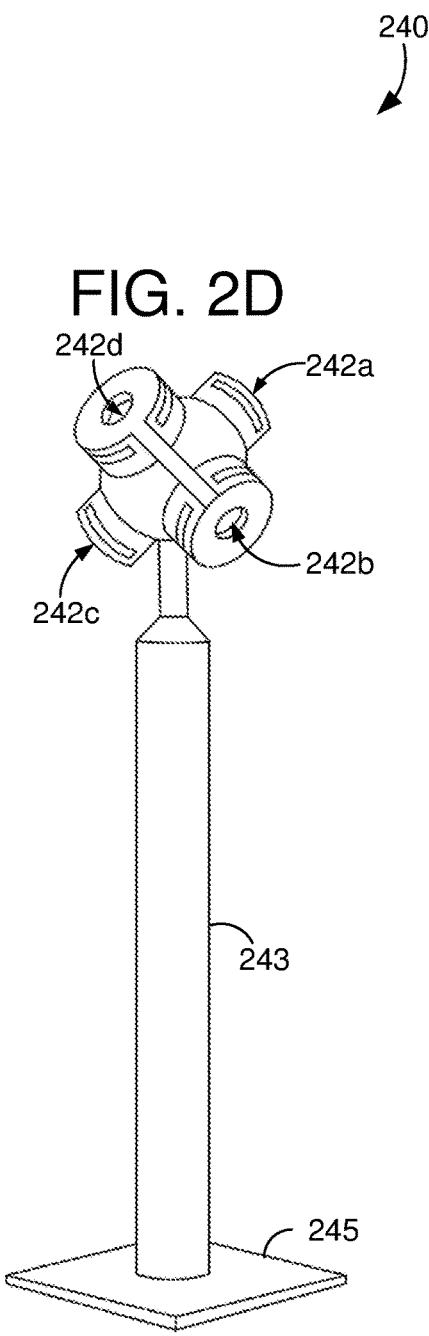

Various microphone configurations are possible. For example, any suitable microphone pattern (e.g., omnidirectional, directional such as bi-directional, cardioid, hypercardioid, shotgun, etc.) and/or microphone geometry (e.g., single microphone, planer array, spherical array, etc.) is possible. In a simple example, one omnidirectional may be utilized. In another example, an array of microphones can be utilized. FIGS. 2A-2D illustrate examples of possible microphone arrays. FIG. 2A depicts linear planer array 210 composed with n microphones 212. FIG. 2B depicts circular planer array 220 composed with n microphones 222. Because the microphones in a planer array may effectively operate with a directional pickup pattern, in some embodiments, two planer arrays can be arranged back-to-back to generate two opposing directional pickup patterns. For example, FIG. 2C illustrates opposing planer arrays 230*a* and 230*b* with microphones 232*aa* . . . 232*an* and 232*ba* . . . 232*bn*, respectively. Some embodiments can implement a spherical array, or an approximation thereof. For example, microphones can be located on vertices of a polyhedron (e.g., tetrahedron, higher order polygons, etc.). For example, FIG. 2D illustrates tetrahedral array 240 composed with four microphones 242*a*, 242*b*, 242*c*, 242*d*. In this example, tetrahedral array 240 is supported by base 245 and arm 243, although any suitable support structure is possible. These microphone configurations are meant merely as examples, and other variations are contemplated within the present disclosure.

Generally, scanner 102*a* emits multiple ultrasound signals from the speaker(s), picks up source signals and reflected signals using its microphone(s), and records raw audio data in any suitable form, whether uncompressed (e.g., WAV, AIFF, AU, PCM) or compressed (e.g., FLAC, M4A, MPEG, WMA, SHN, MP3). In the embodiment illustrated by FIG. 1, scanner 102*a* includes impulse coordination component 110. Impulse coordination component 110 coordinates generation of ultrasonic impulses with the speaker(s) and capture of raw audio data with the microphone(s). For example, impulse coordination component 110 may provide a GUI to allow a user to trigger an impulse and associated capture. Additionally and/or alternatively, impulse coordination component 110 may trigger periodic scans, may trigger scans based on detected motion or detected changes, or otherwise. Generally, impulse coordination component 110 may be integrated with an application or other software component installed on, or otherwise accessible to, scanner 102*a*. In various embodiments, impulse coordination component 110 may be integrated into a stand-alone application, an add-on or plug-in to an application, an application or component associated with one or more of calibration optimization component 122, MR communication application 124, and/or relocalization component 126, and the like.

Figure 3A:
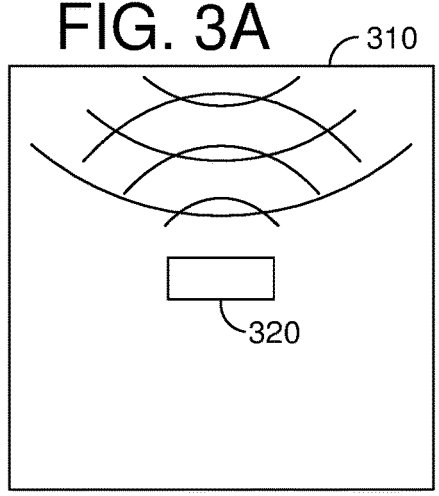
FIGS. 3A-3D illustrate an aerial perspective of a first ultrasonic mapping technique, in accordance with embodiments described herein.
Figure 3B:
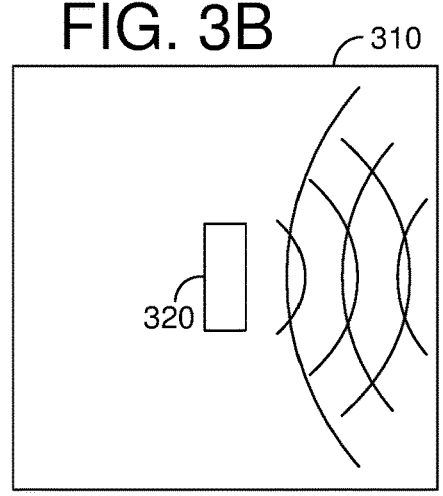
Figure 3C:
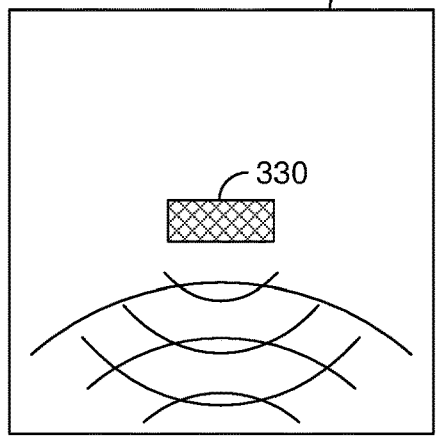
Figure 3D:
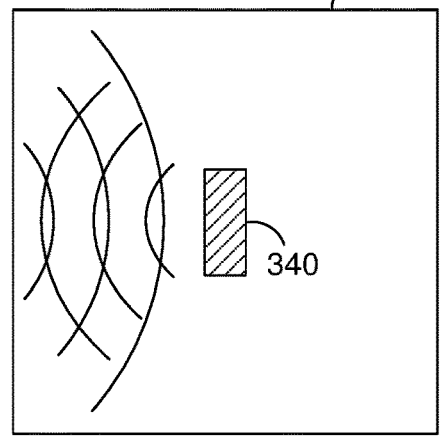

Generally, a scan involves measuring an impulse response by recording source and reflected signals over a suitable time duration as raw audio data. Depending on the microphone pattern and/or geometry, various scanning techniques can be applied in order to gather sufficient raw audio data to generate a sonic map of a particular space. For example, a sonic map can be generated by stitching together four impulse responses measured from four scans performed with a planer array, one scan in each of four directions spanning 360° in the space (e.g., one scan for each of four walls in a room). FIGS. 3A-3D illustrate an aerial perspective of one such scan. In FIG. 3A, device 320 (which may correspond to scanner 102*a* of FIG. 1) performs a first scan in room 310. In FIG. 3B, device 320 rotates 90° to the right and performs a second scan in room 310. In FIG. 3C, a separate device in room 310, device 330, performs a third scan 90° to the right of the second scan. In FIG. 3D, a separate device in room 310, device 340, performs a fourth scan 90° to the right from the third scan. The raw audio data recorded from each of these four scans can be used, with the impulse used to generate the responses, to generate a sonic map for room 310.

Figure 4:
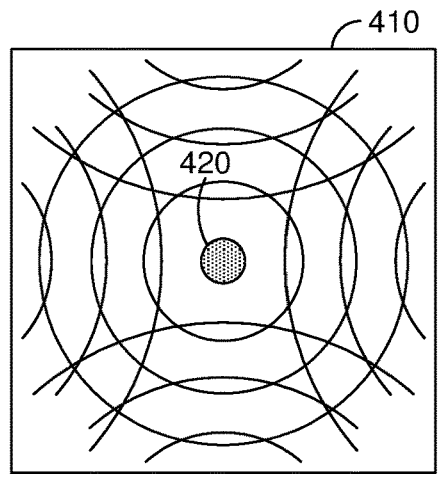
FIG. 4 illustrates an aerial perspective of a second ultrasonic mapping technique, in accordance with embodiments described herein.

Instead or in addition to using multiple scans, a sonic map can be generated from a single scan taken at one using an omnidirectional microphone, a spherical array (or some approximation thereof such as a tetrahedral array), two opposing planer arrays, and the like. FIG. 4 illustrates an aerial perspective of one such scan. In FIG. 4, device 420 performs one scan of room 410. As a general matter, performing multiple scans, whether using one device or multiple devices, may be desirable. For example, the microphone(s) used to perform a scan may have range limitations and/or there may be occlusions in a particular space. As a general matter, additional scans can increase the resolution of a sonic map and/or detected acoustic characteristics.

The design of scanner 102a can impact the number of desirable scans and/or the scanning technique. For example, a small omnidirectional microphone in the middle of a large planer surface (e.g., the back of a smart phone) may only pick up first order reflections from surfaces which the device faces, reducing the effective pickup pattern of the microphone. However, arranging an omnidirectional microphone on a narrow surface such as a device edge or ridge, or on a protrusion, may increase the effective pick-up pattern of the microphone, reducing the need for as many scans.

Generally, the scanning process can include saving or otherwise associating the location of each scan with its respective raw audio data. In the embodiment illustrated in FIG. 1, scanner 102a includes location component 109, which can determine or facilitate determining the location using any combination of hardware and/or software (e.g., using an on-board GPS chip, WiFi, or other known ways of determining device location). Impulse coordination component 110 can utilize location component 109 to determine device location, associate the determined location with the scan and/or the raw audio data, and can store or otherwise facilitate storage of the raw audio data in memory of, or otherwise associated with, scanner 102a. Generally, impulse coordination component 110 communicates the captured raw audio data and associated location to a sonic mapping service to generate a corresponding sonic map.

A sonic mapping service can be provided to generate a sonic map and/or detect acoustic characteristics of the corresponding physical space. A sonic mapping service can be implemented on local device (e.g., scanner 102a), an edge computing device, in a distributed computing environment (e.g., a spatial audio service), or some combination thereof. Additionally and/or alternatively, the sonic mapping service can be private or shared. In the embodiment illustrated in FIG. 1, distributed computing platform 150 includes sonic mapping service 155 as a shared distributed computing service. In this manner, raw audio data can be sent to sonic mapping service 155, which can generate and distribute a sonic map to various devices.

Sonic mapping service 155 accesses captured raw audio data and associated impulse(s) and measurement location(s), whether for a single scan or from multiple scans, and generates and/or updates a corresponding sonic map. The sonic map is a 3D model of the space in which the scans occurred. The sonic map is an acoustic rendering of the space because it is generated using audio data. Generally, sonic mapping service 155 analyzes the delays between the source signal and the reflected signal, using the known relative positions of the speaker(s) and microphone(s), to generate a vector representing where the depths of various locations are around the space. This vector can be used in combination with the location of the scan to generate the sonic map. In some embodiments, sonic mapping component 155 utilizes machine learning to generate the sonic map and/or detect acoustic characteristics of the space. Generally, the more scans there are, the higher the resolution of the resulting sonic map.

In some embodiments, sonic mapping component 155 detects and/or update detected acoustic characteristics of a space by processing the generated impulse, the measured impulse response(s) (e.g., raw audio data), and/or a sonic map. Acoustic characteristics can include materials, occlusions, reverberations, reflections, absorptions, and the like. In some embodiments, sonic mapping component 155 can deduce some acoustic characteristics from others. For example, detected reverberations may be used as an indication that a corresponding surface comprises a particular material such as wood (e.g., a wood floor space). Additionally and/or alternatively, sonic mapping component 155 can attribute visual/audio features to elements of the sonic map based on a corresponding detected acoustic characteristic. For example, sonic mapping component 155 can apply visual textures or other visualizations of detected materials to corresponding elements of the sonic map (e.g., a detected wall or table). In another example, sonic mapping component 155 can apply audio features to corresponding elements of the sonic map (e.g., if you drop something on a corresponding surface, the object bounces and the impact sounds like an impact with wood). Generally, sonic mapping service 155 can store sonic maps and corresponding acoustic characteristics in map bank 165, and distribute them to authorized devices.

Distributed computing platform 150 may also include visual mapping service 160. Generally, visual mapping service 160 generates or otherwise accesses a visual map comprising a 3D model of a particular space generated using measurements taken with one or more optical components such as depth cameras, IR sensors, etc. Generally, the visual map is a visual rendering of the space because it is generated using measurements taken with one or more optical components. Visual mapping service 160 may attribute visual/audio features to elements of the visual map and/or individual 3D objects based on a corresponding detected acoustic characteristic. For example, sonic mapping service 155 may recognize material types based on their acoustic reflectance, and visual mapping service 160 can apply a corresponding visual appearance to a corresponding object (e.g., so a metal pillar looks like metal). Similarly, corresponding physical properties can be modeled (e.g., acoustic properties, reaction properties, haptics, etc.). For example, dropping a particular 3D model of an object on a wooden table can generate a reaction consistent with wood (e.g., sound, bounce, etc.). In another example, different haptic treatments can be applied to a haptic actuator for different material types, so when a user attempts to touch that material, a corresponding haptic effect can be generated. In this manner, knowledge gleaned using sonar can be used to enhance the virtualization of corresponding objects. Generally, visual mapping service can store visual maps and corresponding 3D objects in map bank 165, and distribute them to authorized devices.

Any number of authorized devices can be configured to download a sonic map or other information derived from raw audio data (e.g., acoustic characteristics, a visual map, etc.). By way of nonlimiting example, scanner 102a includes calibration optimization component 122, mixed reality (MR) communication component 124, relocalization component 126, and configuration component 128. Any or all of these components may be implemented as a part of scanner 102a, or part of some other suitable computing device.

Calibration optimization component 122 can be used to optimize calibrations of cameras, microphones, and/or speakers based on a sonic map. With respect to audio, the sound of a given device can be automatically changed based on a mapped space. For example, speakers can be optimized to improve their performance in the virtual acoustic environment corresponding to the sonic map by adjusting audio settings to compensate for a reverberant room (e.g., increasing the volume, applying a particular filter, etc.). With respect to microphones, the pattern of a particular microphone can be automatically adjusted based on a mapped space. For example, in a reverberant space, a microphone pattern can be automatically adjusted to be more directional to focus on the location of users in a space. With respect to cameras, settings such as focal depth and field of view can be automatically adjusted based on a mapped space. For example, if a sonar map indicates that most of the subjects of a group photograph are standing in a particular location (e.g., 50 feet away), the camera can be automatically focused where the subjects are located. Additionally and/or alternatively to automatically optimizing calibrations of cameras, microphones, and/or speakers, a notification or digital assistant can be triggered to facilitate a manual or semi-manual re-calibration. Other variations will be understood by those of ordinary skill in the art.

Mixed reality (MR) communication component 124 can generate an audio transform to recreate the virtual acoustic space corresponding to a sonic map. Applying this audio transform changes the impulse response of a particular room so it sounds like the mapped space. For example, if the virtual acoustic environment is a mapped conference room, MR communication component 124 can transform an audio feed (e.g., an audio feed of the meeting) using the audio transform for remote users. The audio feed can be a stereo signal, monophonic signals, surround sound signals, or any other suitable signal. This transformation creates the effect that the remote users are actually in the meeting room. The effect can be enhanced by using a hearable audio device that includes some way to measure head orientation data (e.g., an inertial motion unit), and applying the audio transformation based on measured head orientation data. Sonic maps (whether for open spaces like a factory floor or closed rooms like conference rooms) can be saved, associated with the corresponding physical space, and automatically used to transform an audio feed (e.g., an audio feed of a meeting occurring in the physical space) for remote users. In some embodiments, an audio feed (e.g., the meeting feed) can be automatically recalibrated based on a number of people in the room and/or any detected changes to the space (e.g., an opened window). Various other mixed reality communication applications will be understood by those of ordinary skill in the art, and are contemplated within the present disclosure.

Relocalization component 126 generally facilitates relocalization based on the sonic map. For example, using a known map (e.g., a sonic map, visual map, etc.), a scan can be performed and the results compared with the known map to locate the scanning device within the map. Similarly, a scan can be performed and the results compared with known maps to locate a particular space (e.g., which room in the building the device is located). Variations will be understood by those of ordinary skill in the art.

Configuration component 128 provides a user interface to enable a user input to customize a corresponding virtual environment. For example, values of acoustic characteristics such as absorption (e.g., via wall material), reflection, occlusion, reverberation, and the like, can be exposed to the user to facilitate fine tuning the virtual acoustic environment (and the associated impulse response) and/or any dependent 3D models. By way of nonlimiting example, if a user desired to make a wooden table sound and look like it was metal, configuration component 128 can accept a user selection of a corresponding object/surface (e.g., in a displayed visualization of the sonic map), and an indication to apply a visual texture (e.g., a metallic treatment), acoustic properties (e.g., a metallic or hollow sound), behaviors of 3D objects (e.g., bounce), etc. Configuration component 128 can then apply the change. Variations for customizing a virtual environment will be understood by those of ordinary skill in the art.

Figure 5:
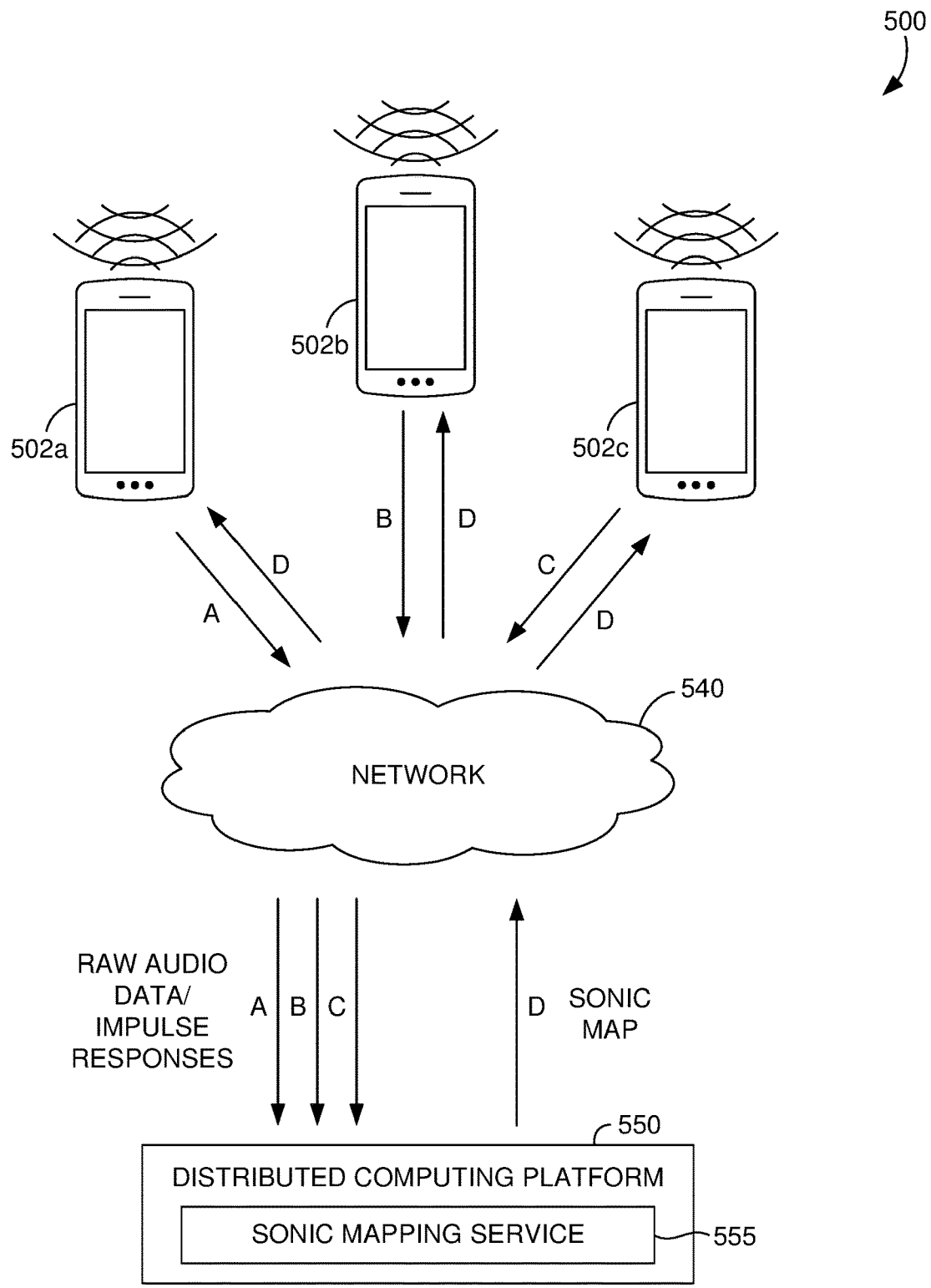
FIG. 5 illustrates an example process flow for generating a collaborative sonic map using an example ultrasonic mapping system, in accordance with embodiments described herein.

Turning now to FIG. 5, FIG. 5 illustrates an example process flow for generating a collaborative sonic map using an example ultrasonic mapping system, in accordance with embodiments described herein. The ultrasonic mapping system illustrated in FIG. 5 includes mobile computing devices 502*a*, 502*b*, and 502C, network 540, and distributed computing platform 550 with sonic mapping service 555. An example process for generating a collaborative sonic map is indicated in FIG. 5 by letters A-D. For example, mobile computing device 502*a* performs a first sonic scan to measure an impulse response (e.g., raw audio data), determines the scan location, and transmits this sonic scan data to sonic mapping service 555 (letter A). Mobile computing device 502*b* performs a second sonic scan and transmits the corresponding sonic scan data to sonic mapping service 555 (letter B). Mobile computing device 502*c* performs a third sonic scan and transmits the corresponding sonic scan data to sonic mapping service 555 (letter C). Sonic mapping service 555 generates a collaborative sonic map from the sonic scan data and transmits the sonic map to each of mobile computing devices 502*a*, 502*b*, and 502C (letter D).

Although in some embodiments, the scanners are described as mobile computing devices, this need not be the case. For example, in some embodiments, a network of fixed scanning devices (e.g., IoT devices) can be utilized to generate or contribute to a sonic map. For example, a network of two or more IoT devices can operate in concert to provide a synthetic aperture for sensing and/or a phased array for pulse generation and/or steering. In these examples, the impulses generated by the fixed scanning devices can be synced using known IoT device locations and orientations to produce constructive interference in a desired device. Other variations and combinations of fixed and/or mobile scanning devices may be implemented within the present disclosure.

Flow Diagrams

Figure 6:
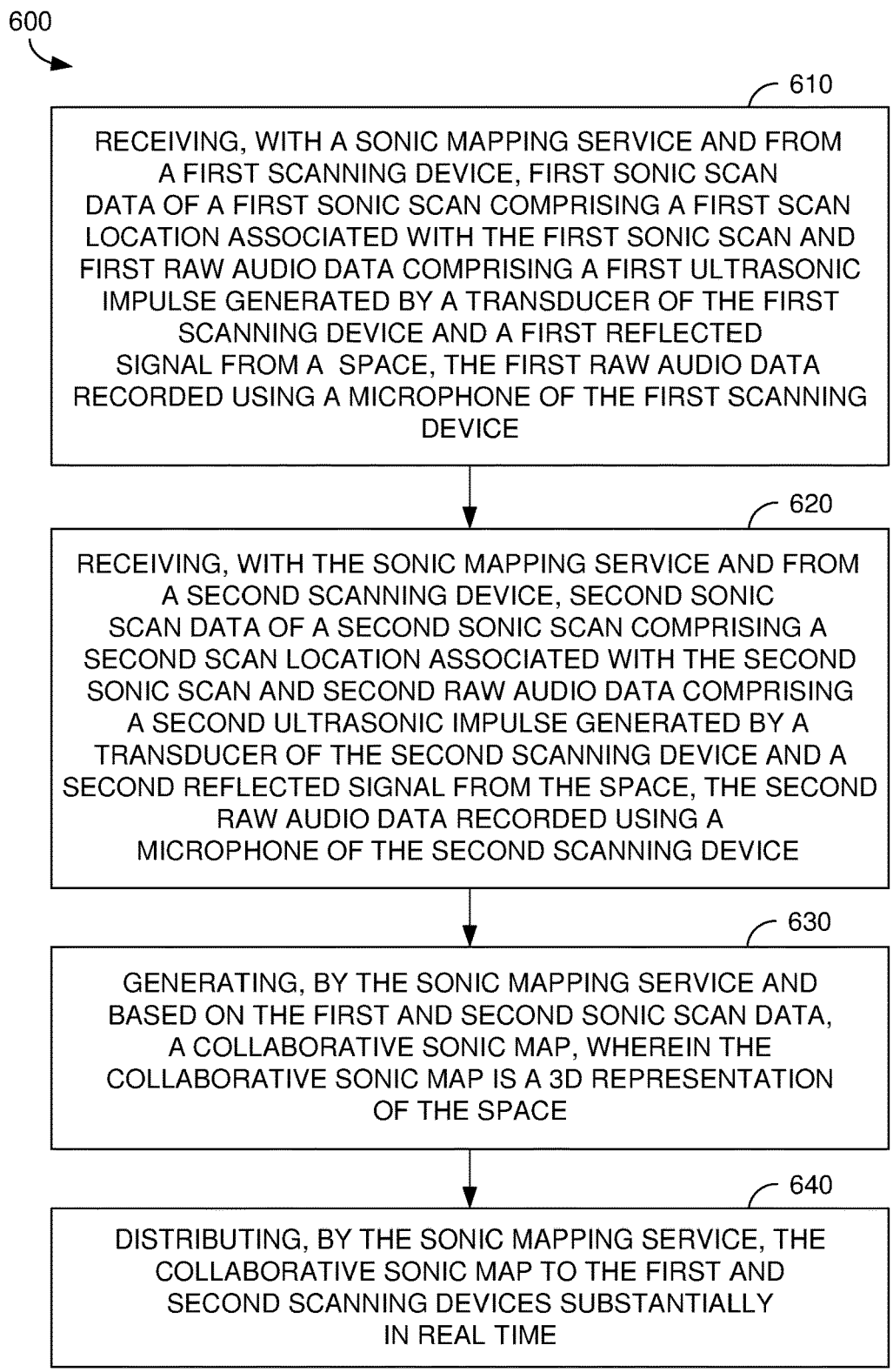
FIG. 6 is a flow diagram showing a method for ultrasonic mapping involving a collaborative map, in accordance with embodiments described herein.
Figure 7:
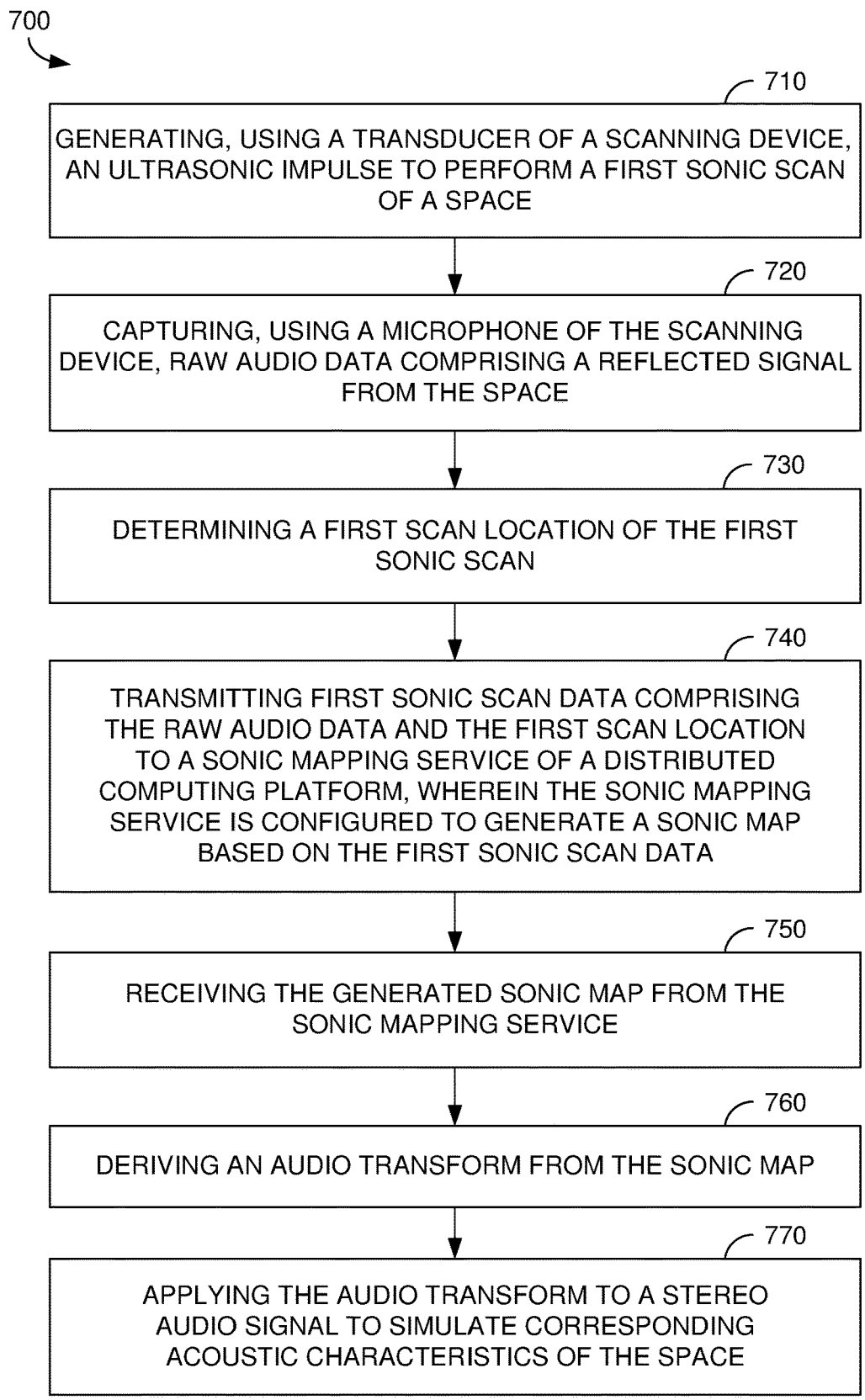
FIG. 7 is a flow diagram showing a method for ultrasonic mapping involving a sonic mapping service of a distributed computing platform, in accordance with embodiments described herein.
Figure 8:
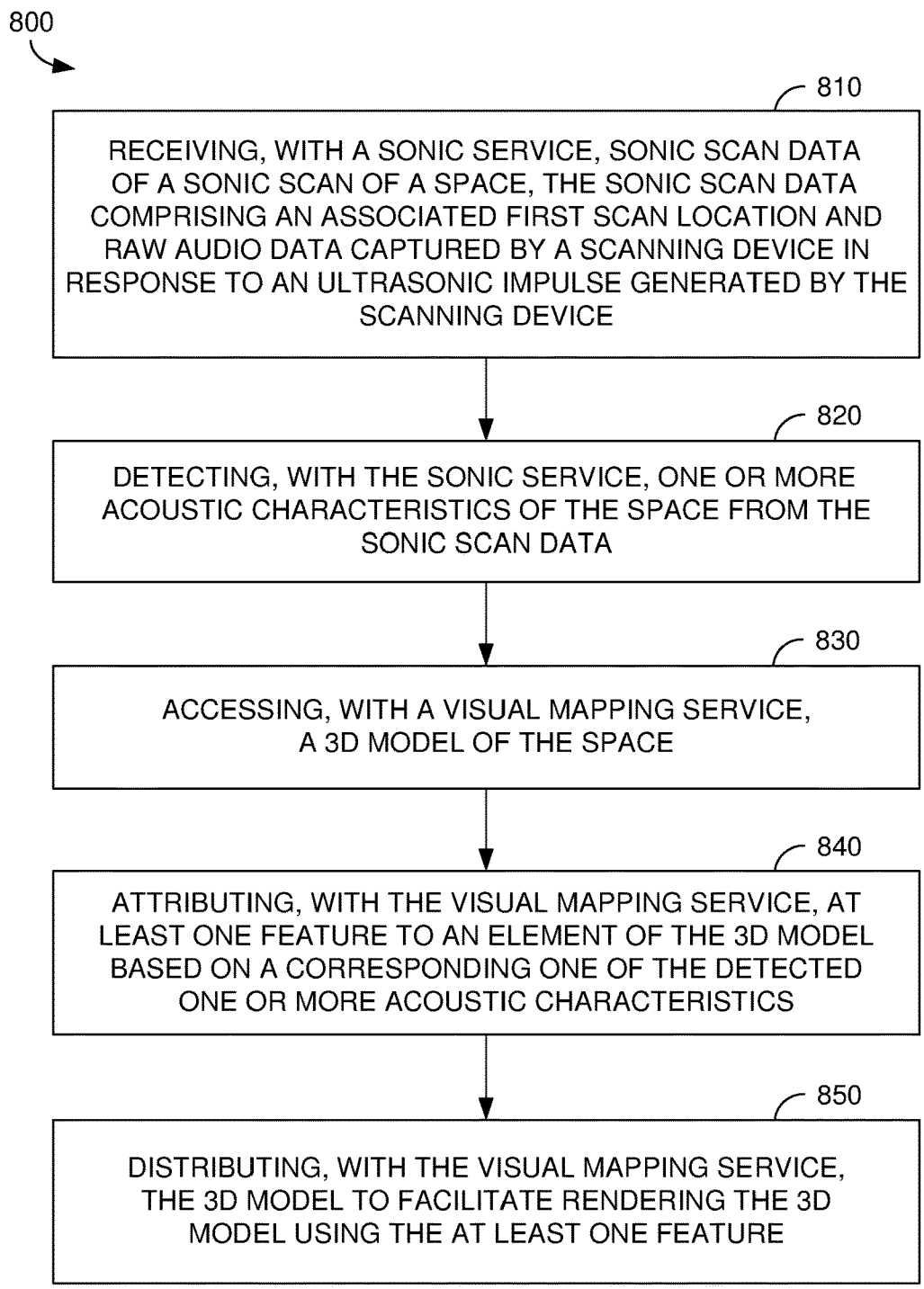
FIG. 8 is a flow diagram showing a method involving a sonic service and a visual mapping service, in accordance with embodiments described herein.

With reference to FIGS. 6-8, flow diagrams are provided illustrating methods for ultrasonic mapping and/or sonic services. The methods can be performed using the ultrasonic mapping system described herein. In embodiments, one or more computer storage media having computer-executable instructions embodied thereon can, when executed by one or more processors, cause the one or more processors to perform the methods involving the ultrasonic system.

Turning now to FIG. 6, a flow diagram is provided that illustrates method 600 for ultrasonic mapping involving a collaborative map. Initially at block 610, first sonic scan data of a first sonic scan is received with a sonic mapping service from a first scanning device. The first sonic scan data includes a first scan location associated with the first sonic scan and first raw audio data. The first raw audio data includes a first ultrasonic impulse generated by a transducer of a first scanning device and a first reflected signal from a space. The first raw audio data was recorded using a microphone of the first scanning device. At block 620, second sonic scan data of a second sonic scan is received with the sonic mapping service from a second scanning device. The second sonic scan data includes a second scan location associated with the second sonic scan and second raw audio data. The second raw audio data includes a second ultrasonic impulse generated by a transducer of the second scanning device and a second reflected signal from the space. The second raw audio data was recorded using a microphone of the second scanning device. At block 630, the sonic mapping service generates a collaborative sonic map based on the first and second sonic scan data. The collaborative sonic map is a 3D representation of the space. At block 640, the sonic mapping service distributes the collaborative sonic map to the first and second scanning devices substantially in real time.

Turning now to FIG. 7, a flow diagram is provided that illustrates method 700 for ultrasonic mapping involving a sonic mapping service of a distributed computing platform. Initially at block 710, an ultrasonic impulse is generated using a transducer of a scanning device to perform a first sonic scan of a space. At block 720, raw audio data comprising a reflected signal from the space is captured using a microphone of the scanning device. At block 730, a first scan location of the first sonic scan is determined. At block 740, first sonic scan data comprising the raw audio data and the first scan location is transmitted to a sonic mapping service of a distributed computing platform. The sonic mapping service is configured to generate a sonic map based on the first sonic scan data. At block 750, the generated sonic map is received from the sonic mapping service. At block 760, an audio transform is derived from the sonic map. At block 770, the audio transform is applied to an audio signal to simulate corresponding acoustic characteristics of the space.

Turning now to FIG. 8, a flow diagram is provided that illustrates method 800 involving a sonic service and a visual mapping service. Initially at block 810, a sonic service receives sonic scan data of a sonic scan of a space. The sonic scan data includes an associated first scan location and raw audio data captured by a scanning device in response to an ultrasonic impulse generated by the scanning device. At block 820, the sonic service detects one or more acoustic characteristics of the space from the sonic scan data. At block 830, a visual mapping service accesses a 3D model of the space. At block 840, the visual mapping service attributes at least one feature to an element of the 3D model based on a corresponding one of the detected one or more acoustic characteristics. At block 850, the visual mapping service distributes the 3D model to facilitate rendering the 3D model using the at least one feature.

Exemplary Distributed Computing Environment

Figure 9:
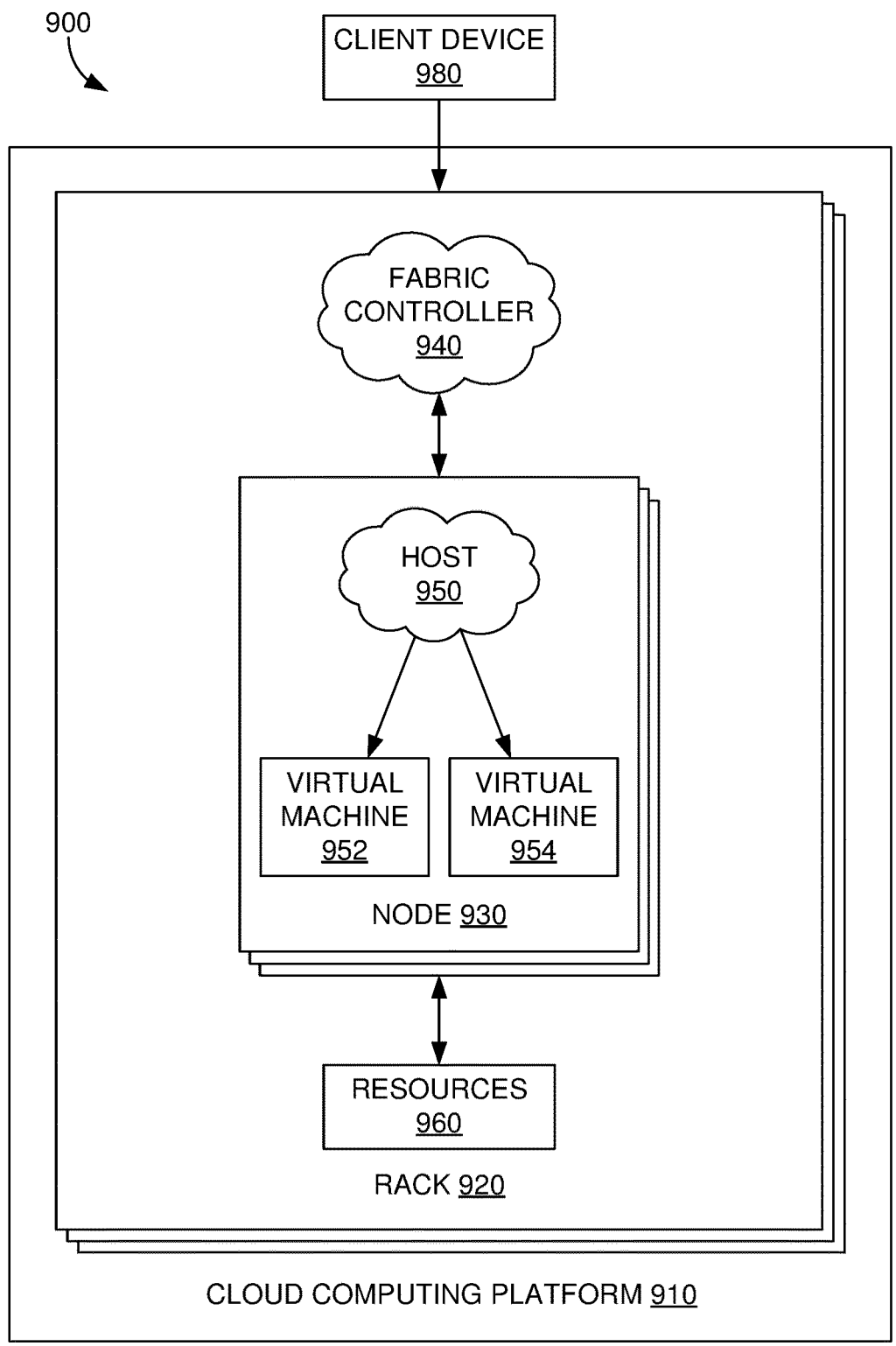
FIG. 9 is a block diagram of an example distributed computing environment suitable for use in implementing embodiments described herein.

Referring now to FIG. 9, FIG. 9 illustrates an exemplary distributed computing environment 900 in which implementations of the present disclosure may be employed. In particular, FIG. 9 shows a high level architecture of a system in cloud computing platform 910, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 900 that includes cloud computing platform 910, rack 920, and node 930 (e.g., computing devices, processing units, or blades) in rack 920. The system can be implemented with cloud computing platform 910 that runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing infrastructure 910 in a data center can be configured to host and support operation of endpoints of a particular service application. Cloud computing infrastructure 910 may be a public cloud, a private cloud, or a dedicated cloud.

Node 930 can be provisioned with host 950 (e.g., operating system or runtime environment) running a defined software stack on node 930. Node 930 can also be configured to perform specialized functionality (e.g., compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 930, nodes 930 may be partitioned into virtual machines (e.g., virtual machine 952 and virtual machine 954). Physical machines can also concurrently run separate service applications. The virtual machines or physical machines can be configured as individualized computing environments that are supported by resources 960 (e.g., hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device referred to as a cluster. Each server in the cluster can be implemented as a node.

Client device 980 may be linked to a service application in cloud computing platform 910. Client device 980 may be any type of computing device, which may correspond to computing device 900 described with reference to FIG. 9, for example. Client device 980 can be configured to issue commands to cloud computing platform 910. In embodiments, client device 980 may communicate with service applications through a virtual Internet Protocol (IP) and load balancer or other means that direct communication requests to designated endpoints in cloud computing platform 910. The components of cloud computing platform 910 may communicate with each other over a network (not shown), which may include, without limitation, one or more local area networks (LANs) and/or wide area networks (WANs).

Exemplary Augmented Reality Environment

Figure 10:
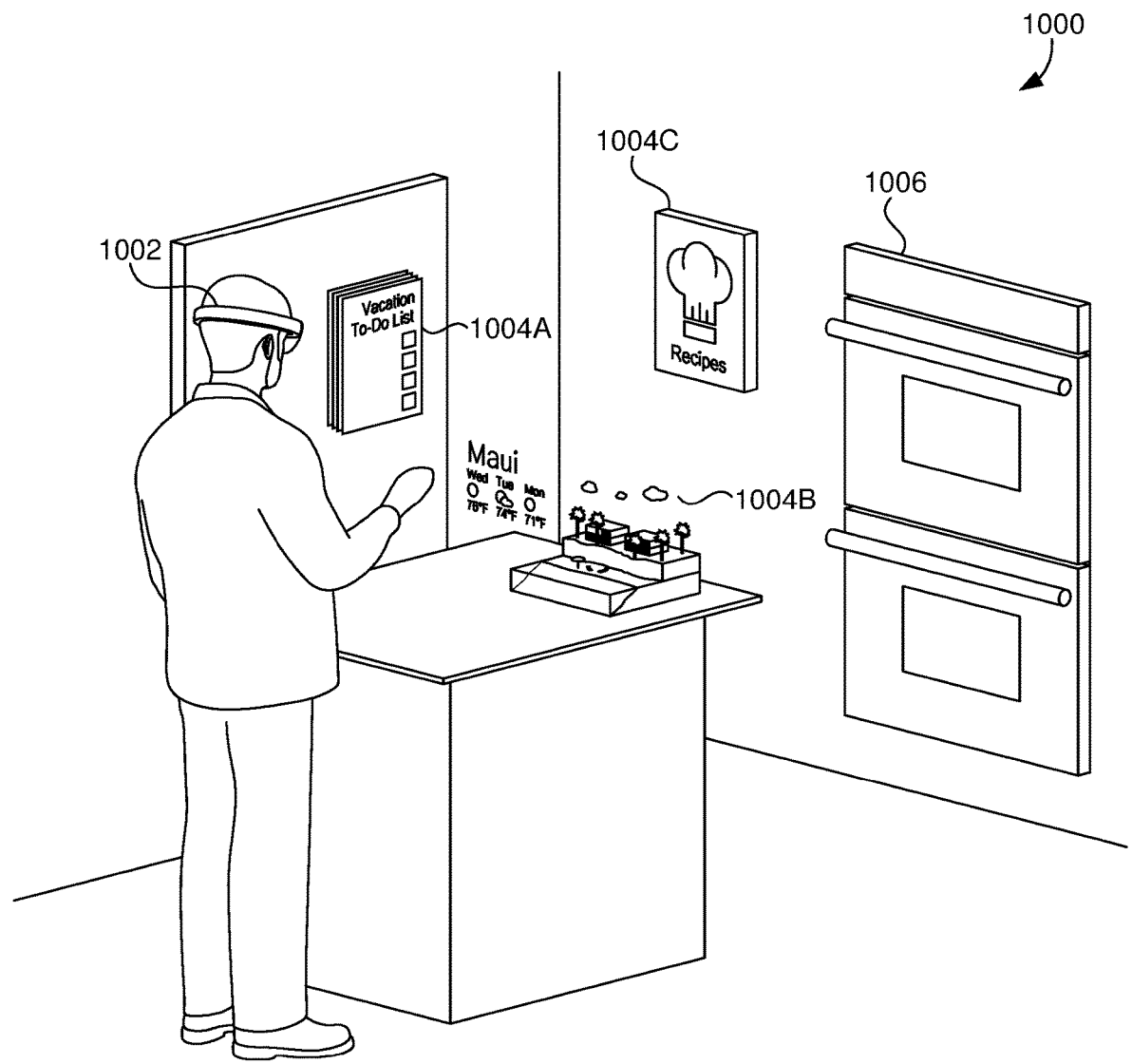
FIG. 10 is an illustrated diagram depicting exemplary augmented reality images of a head-mounted display, in accordance with embodiments described herein.

With reference to FIG. 10, exemplary virtual images generated by a head-mounted display (HMD) are depicted. Generally, a user wears a HMD (e.g., HMD 1002), which permits the user to see the real-world (e.g., background 1006), for example, through a transparent optical component such as a lens. The HMD generates virtual images (e.g., 1004A, 1004B and 1004C) and superimposes the virtual images on the background. In this manner, the virtual images can appear to integrate or otherwise interact with the background. For example, in the embodiment depicted by FIG. 10, virtual image 1004C is a recipe book icon that appears superimposed on, and hanging in mid-air in front of, the cooking oven and/or wall of background 1006.

Figure 11:
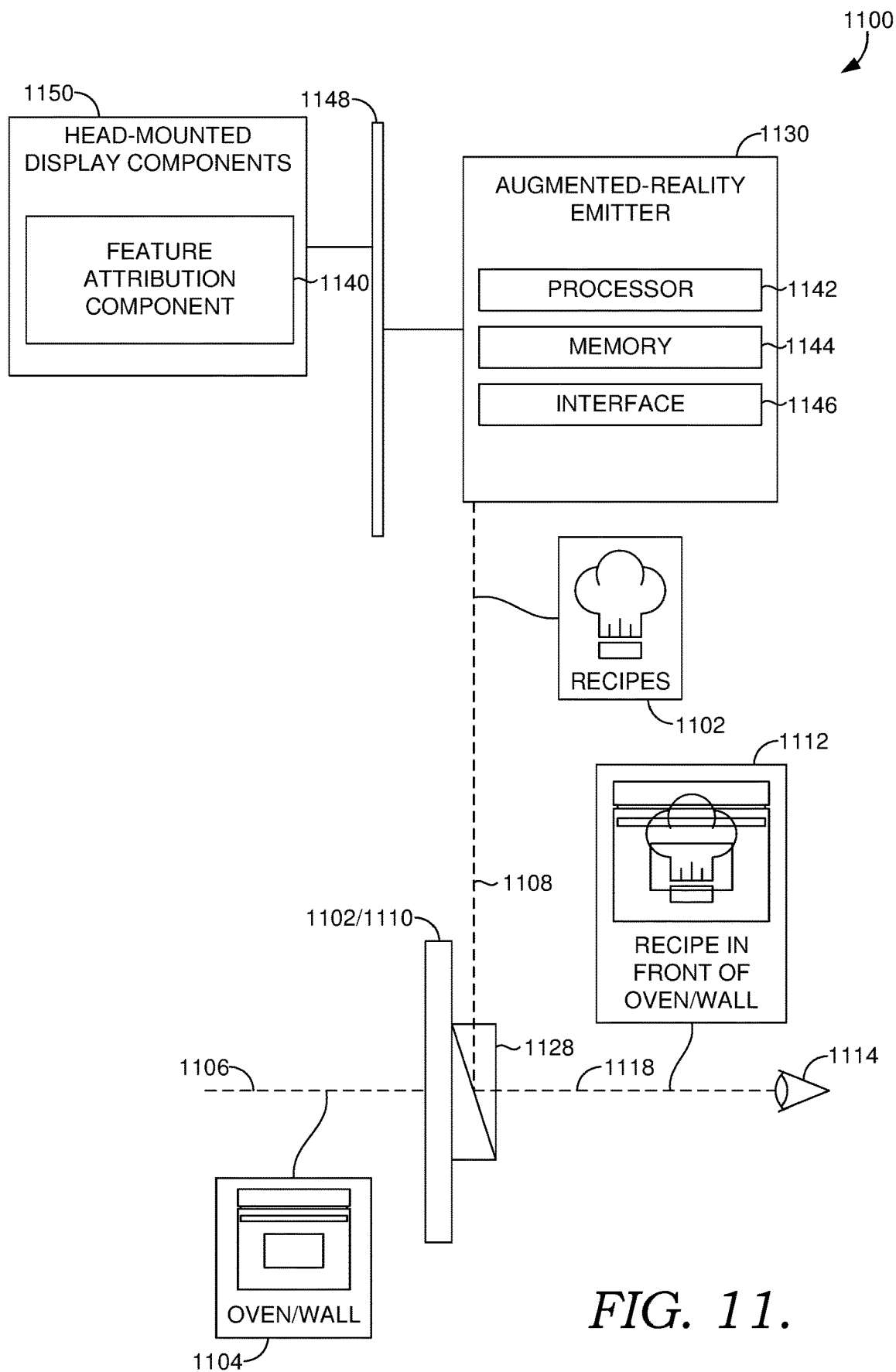
FIG. 11 is a block diagram of an exemplary head-mounted display suitable for use in implementing embodiments described herein.

Turning to FIG. 11, exemplary HMD environment 1100 in which embodiments of the present invention may be implemented is described in order to provide a general context for various aspects of the present invention. Generally, an exemplary HMD might include one or more transparent lenses (e.g., lens 1110), an emitter (e.g., augmented reality emitter 1130) and additional HMD components (e.g., HMD components 1150).

Generally, the HMD places lens 1110 in front of a user's eye (e.g., eye 1114) in a similar manner as an eyeglass lens. In some embodiments, a pair of transparent lenses can be provided, one for each eye. Light from real-world scene 1104 (e.g., light ray 1106) reaches lens 1110. Augmented reality emitter 1130 facilitates projecting and/or rendering of virtual images. Generally, augmented reality emitter 1130 emits light (e.g., light ray 1108) representing a virtual image (e.g., virtual image 1102). Light representing virtual image 1002 (e.g., light ray 1108) also reaches lens 1110. Lens 1110 includes an optical display component 1128, such as a beam splitter (e.g., a half-silvered mirror), that facilitates superimposing virtual image 1002 on top of real-world scene 1104. For example, optical display component 1128 can reflect both of light rays 1106 and 1108 towards the user's eye (e.g., via light path 1118) so the user can view a mixed-reality image (e.g., augmented-reality image 1112). Augmented reality emitter 1130 can utilize additional optics to refocus virtual images so that they appears to originate several feet away from eye 1114, in coordination with real-world scene 1104, instead of at the location of optical display component 1128 (e.g., around an inch from eye 1114).

In the embodiment depicted in FIG. 11, augmented reality emitter 1130 includes components such as processor 1142, memory 1144 and/or interface 1146 that can facilitate augmented reality emitter 1130 functionality. For example, memory 1144 can contain instructions executed by processor 1142 can facilitate rendering, projecting and/or focusing virtual images. Augmented reality emitter 1130 can communicate with HMD components 1150 (e.g., some component that can make use of a sonic map and/or detected acoustic characteristics such as feature attribution component 1140) using any suitable communication path (e.g., bus 1148). In this manner, one or more processors (e.g., processor 1142) can operate as one or more control circuits. Other variations for configurations of augmented reality emitter components (e.g., utilizing variations for hardware control circuitry) may be implemented, as would be understood by a person of ordinary skill in the art.

As such, light rays representing a virtual image (e.g., virtual image 1102) and light rays from a real-world scene (e.g., real-world scene 1104) are reflected by display component 1128 toward a user's eye so that the user sees augmented-reality image 1112. Augmented-reality image 1112 is a composite image comprising real-world scene 1104 (e.g., a cooking oven) with virtual image 1102 (e.g., a recipe book icon) superimposed on top. In this manner, a user views a mixed-reality image (e.g., augmented-reality image 1112) in which a virtual image is superimposed on a real-world scene (e.g., the recipe book icon appears hanging in front of the cooking oven).

Exemplary Operating Environment

Figure 12:
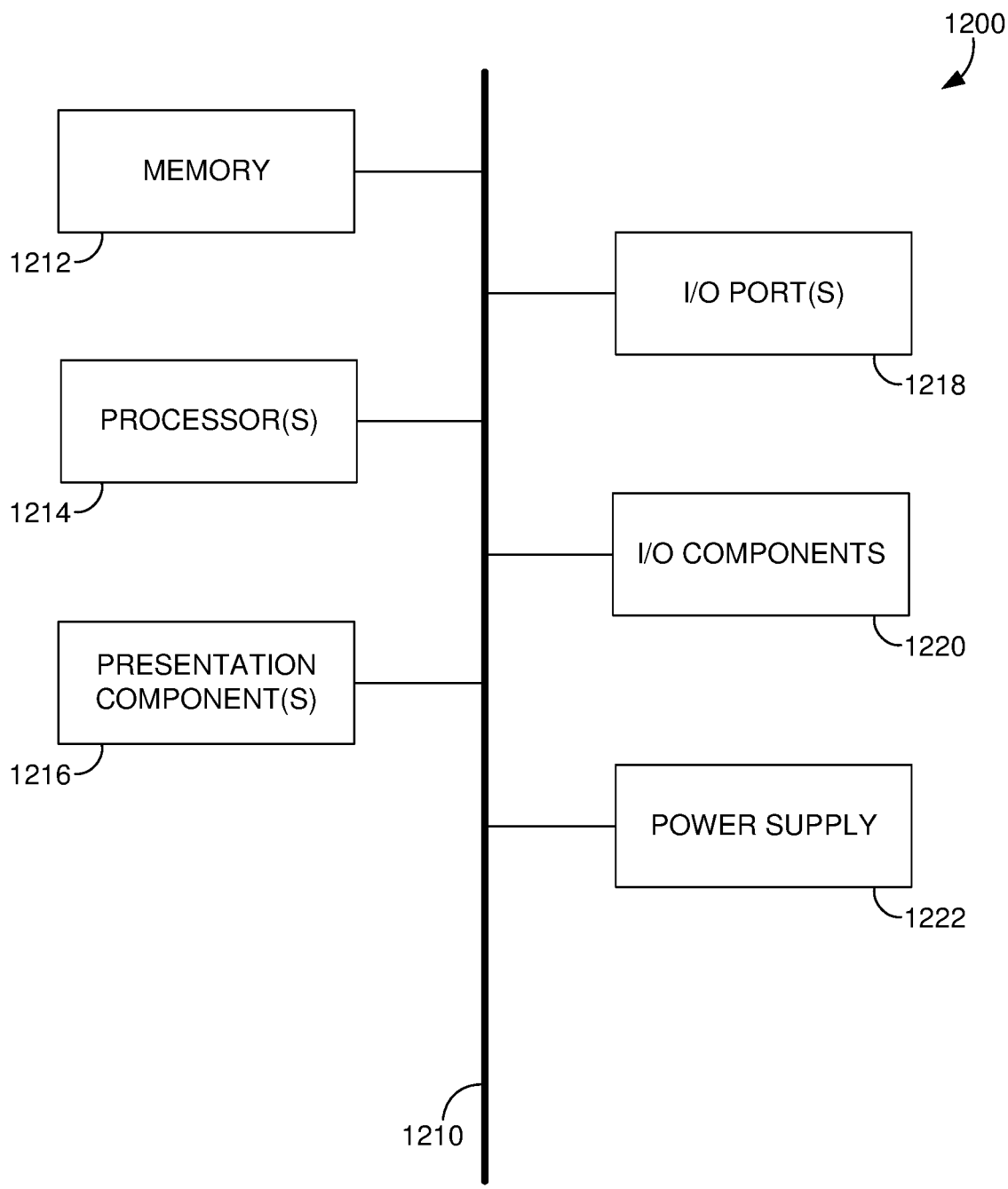
FIG. 12 is a block diagram of an exemplary operating environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output ports 1218, input/output components 1220, and illustrative power supply 1222. Bus 1210 represents what may be one or more buses (such as an address bus, data bus, or combination thereof). The various blocks of FIG. 12 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

With reference to the ultrasonic mapping system, embodiments described herein support mixed reality communications, automatic calibration, relocalization, visualizing materials, rendering 3D geometry, and the like. The ultrasonic mapping system components refer to integrated components for ultrasonic mapping. The integrated components refer to the hardware architecture and software framework that support functionality within the ultrasonic mapping system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the ultrasonic mapping system can include an API library that includes specifications for routines, data structures, object classes, and variables may support the interaction between the hardware architecture of the device and the software framework of the ultrasonic mapping system. These APIs include configuration specifications for the ultrasonic mapping system such that the different components therein can communicate with each other in the ultrasonic mapping system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the ultrasonic mapping system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for ultrasonic mapping, the method comprising:
receiving, with a sonic mapping service and from a first scanning device, first sonic scan data of a first sonic scan comprising:
first raw audio data comprising a first ultrasonic impulse generated by a transducer of the first scanning device and a first reflected signal from a space, the first raw audio data recorded using a microphone of the first scanning device; and
a first scan location associated with the first sonic scan;
receiving, with the sonic mapping service and from a second scanning device, second sonic scan data of a second sonic scan comprising:
second raw audio data comprising a second ultrasonic impulse generated by a transducer of the second scanning device and a second reflected signal from the space, the second raw audio data recorded using a microphone of the second scanning device; and
a second scan location associated with the second sonic scan;
generating, by the sonic mapping service and based on the first and second sonic scan data, a collaborative sonic map, wherein the collaborative sonic map is a 3D representation of the space; and
distributing, by the sonic mapping service, the collaborative sonic map to the first and second scanning devices substantially in real time.

2. The method of claim 1, wherein the sonic mapping service is a distributed computing service configured to utilize machine learning to generate the collaborative sonic map.

3. The method of claim 1, further comprising deriving an audio transform from the collaborative sonic map to facilitate simulating corresponding acoustic characteristics of the space.

4. The method of claim 3, further comprising distributing the audio transform to a hearable audio device configured to measure head orientation data and apply the derived audio transform based on the head orientation data.

5. The method of claim 1, wherein the first scanning device is configured to automatically adjust a calibration of at least one of a camera, a microphone, or a speaker based on the collaborative sonic map.

6. The method of claim 1, wherein the first scanning device is configured to relocalize its position on the collaborative sonic map.

7. The method of claim 1, wherein the first scanning device includes a configuration component configured to enable a user input customizing an acoustic characteristic of a virtual environment corresponding to the collaborative sonic map.

8. One or more computer storage media storing computer-useable instructions that, when used by a scanning device, cause the scanning device to perform operations comprising:
generating, using a transducer of the scanning device, an ultrasonic impulse to perform a first sonic scan of a space;
capturing, using a microphone of the scanning device, raw audio data comprising a reflected signal from the space;
determining a first scan location of the scanning device during the first sonic scan;
transmitting first sonic scan data comprising the raw audio data and the first scan location to a sonic mapping service of a distributed computing platform, wherein the sonic mapping service is configured to generate a sonic map based on the first sonic scan data; and
receiving the generated sonic map from the sonic mapping service.

9. The one or more computer storage media of claim 8, wherein the sonic map is a collaborative sonic map, and wherein the sonic mapping service is configured to generate the collaborative sonic map using sonic scan data captured from a plurality of mobile computing devices.

10. The one or more computer storage media of claim 8, the operations further comprising:
deriving an audio transform from the sonic map; and
applying the derived audio transform to an audio signal to simulate corresponding acoustic characteristics of the space.

11. The one or more computer storage media of claim 10, the operations further comprising:
measuring head orientation data; and
applying the derived audio transform based on the head orientation data.

12. The one or more computer storage media of claim 8, the operations further comprising:
automatically adjusting a calibration of at least one of a camera, a microphone, or a speaker based on the sonic map.

13. The one or more computer storage media of claim 8, the operations further comprising:
relocalizing position of the scanning device on the sonic map.

14. The one or more computer storage media of claim 8, the operations further comprising:
enabling a user input customizing one of the acoustic characteristics of the space corresponding to the sonic map.

15. A computer system comprising:
one or more hardware processors and memory configured to provide computer program instructions to the one or more hardware processors;
a sonic service configured to utilize the one or more hardware processors to:
receive sonic scan data of a sonic scan of a space, the sonic scan data comprising an associated first scan location and raw audio data captured by a scanning device in response to an ultrasonic impulse generated by the scanning device; and
detect one or more acoustic characteristics of the space, including a material type of a surface in the space, from the sonic scan data; and
a visual mapping service configured to utilize the one or more hardware processors to:
access a 3D model of the space;
attribute at least one feature to an element of the 3D model based on the detected material type; and distribute the 3D model to facilitate rendering the 3D model using the at least one feature.

16. The computer system of claim 15, wherein the sonic service is a distributed computing service configured to utilize machine learning to detect the acoustic characteristics.

17. The computer system of claim 15, wherein the sonic service is configured to detect the acoustic characteristics using sonic scan data captured from a plurality of mobile computing devices.

18. The computer system of claim 15, wherein the at least one feature is a visual texture corresponding to the detected material type, wherein the visual mapping service is configured to attribute the visual texture to a corresponding surface of the 3D model.

19. The computer system of claim 15, wherein the at least one feature is an acoustic response property corresponding to the detected material type, wherein the visual mapping service is configured to attribute the acoustic response property to a corresponding surface of the 3D model.

20. The computer system of claim 15, wherein the at least one feature is an physical reaction property corresponding to the detected material type, wherein the visual mapping service is configured to attribute the physical reaction property to a corresponding surface of the 3D model.

* * * * *